H. O. AMES.
Evaporating Pan.

No. 214,606. Patented April 22, 1879.

WITNESSES:
Chas. Nida
C. Sedgwick

INVENTOR:
H. O. Ames
BY Munn & Co
ATTORNEYS.

UNITED STATES PATENT OFFICE.

HUGH O. AMES, OF NEW ORLEANS, LOUISIANA.

IMPROVEMENT IN EVAPORATING-PANS.

Specification forming part of Letters Patent No. 214,606, dated April 22, 1879; application filed August 27, 1878.

*To all whom it may concern:*

Be it known that I, HUGH O. AMES, of New Orleans, in the parish of Orleans, State of Louisiana, have invented a new and Improved Evaporating-Pan, of which the following is a specification.

Figure 1:
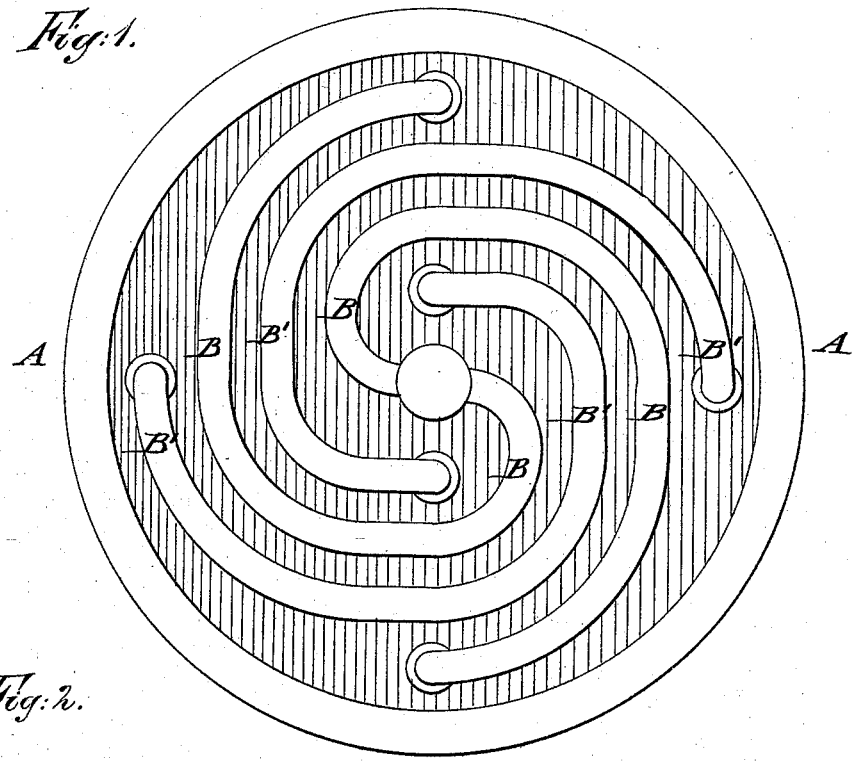
Figure 2:
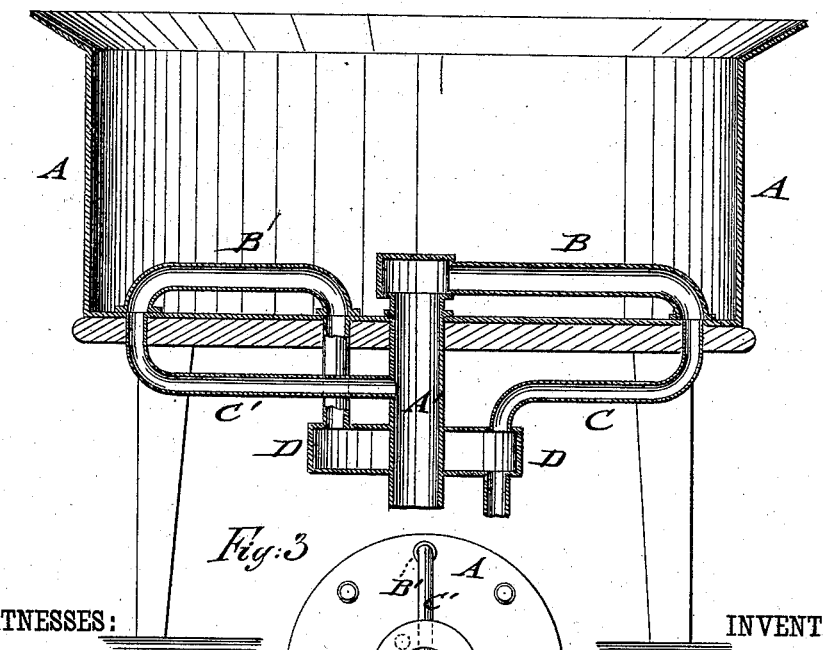
Figure 3:
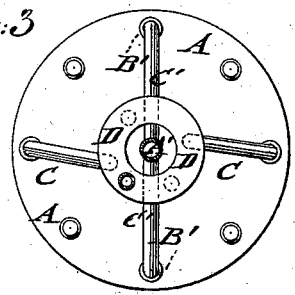

In the accompanying drawings, Figure 1 represents a top view, Fig. 2 a vertical central section, and Fig. 3 a bottom view, of my improved evaporating-pan.

Similar letters of reference indicate corresponding parts.

This invention has reference to such improvements in sugar-evaporating pans that an equal temperature is diffused throughout the entire mass of the boiling sirup, and thereby the whole mass brought simultaneously to the boiling-point at the center as well as the circumference, which results in an improved quality and quantity of sugar obtained from a given amount of sirup.

In the evaporating-pans heretofore used, the evaporating steam-pipes received their steam from a central steam-chamber, while the condensed steam was discharged from the ends of the pipes at the circumference of the pan and returned to a central condensed-steam chamber. In this case all the pipes were situated within the pan. By this arrangement the steam diffused almost an equal temperature throughout the mass of boiling sugar, with the objection, however, that the boiling-point was reached sooner at the center than at the circumference, as the steam was hotter at the center than at the extremities of the pipes.

The object of this invention is to obviate this difference in the boiling temperature, and furnish an evaporating-pan in which the sirup reaches the boiling-point simultaneously at the center as well as at the circumference; and the invention consists of an evaporating-pan in which one half of the evaporating-pipes are supplied with steam at the center, discharging the condensed steam at the circumference, while the other half of the evaporating-pipes are supplied with steam at the circumference, discharging the condensed steam at the center, both sets of pipes being connected with a central steam-supply pipe and with a common condensing-chamber below the bottom of the pan.

Referring to the drawings, A represents a sugar-evaporating pan of the usual size and material, which is provided with a series of evaporating-pipes, B, that are supplied with steam at or near the center, being then extended in a radiating curve to the circumference, and there conducted through the bottom of the pan to the outside. The condensed steam is there taken up by radial return-pipes C and conducted to a central circular or ring shaped casing, D, for the condensed steam.

A second series of evaporating-pipes, B', are supplied with steam from the central steam-supply pipe, A', by means of radial connecting-pipes C' at the circumference of the pan, the condensed steam being discharged near the center through the bottom of the pan into the condensed-steam chamber or casing D, and then to the outside.

By this arrangement an equal temperature is obtained at the circumference as well as at the center of the mass of sirup, and thereby the boiling-point reached at the same time throughout the entire mass.

As an equal temperature is imparted to the mass of sirup throughout, an improved quality and increased quantity of sugar are obtained.

Having thus fully described my invention, I claim as new and desire to secure by Letters Patent—

An evaporating-pan in which the heating-pipes alternate, one-half being supplied with steam at the center, and one-half at the circumference, the steam being thus caused to run in both directions, as and for the purpose specified.

HUGH OSWALD AMES.

Witnesses:
 R. C. BLACK,
 JOSH. C. O. WALLIS.